(12) United States Patent
Cioceanu

(10) Patent No.: US 8,721,182 B2
(45) Date of Patent: May 13, 2014

(54) BENT BEARING ASSEMBLY FOR DOWNHOLE MUD MOTOR

(76) Inventor: Nicu Cioceanu, Edmonton (CA)

( * ) Notice: Subject to any disclaimer, the term of this patent is extended or adjusted under 35 U.S.C. 154(b) by 34 days.

(21) Appl. No.: 13/251,764

(22) Filed: Oct. 3, 2011

(65) Prior Publication Data

US 2013/0051716 A1    Feb. 28, 2013

(30) Foreign Application Priority Data

Aug. 31, 2011 (CA) ..................................... 2751181

(51) Int. Cl.
*F16C 3/00* (2006.01)
*E21B 7/04* (2006.01)
*E21B 10/00* (2006.01)

(52) U.S. Cl.
USPC ............................................. 384/97; 175/371

(58) Field of Classification Search
USPC ........ 384/97, 92–95; 175/61, 62, 73–75, 371, 175/372
See application file for complete search history.

(56) References Cited

U.S. PATENT DOCUMENTS

| | | | |
|---|---|---|---|
| 4,098,561 A | 7/1978 | Tschirky et al. | |
| 4,220,380 A | 9/1980 | Crase et al. | |
| 4,546,836 A | 10/1985 | Dennis et al. | |
| 4,577,704 A | 3/1986 | Aumann | |
| 4,683,964 A | 8/1987 | Wenzel | |
| 5,037,212 A * | 8/1991 | Justman et al. | 384/97 |
| 5,048,981 A | 9/1991 | Ide | |
| 5,096,004 A | 3/1992 | Ide | |
| 5,195,754 A | 3/1993 | Dietle | |
| 5,217,080 A | 6/1993 | Wenzel et al. | |
| 5,248,204 A | 9/1993 | Livingston et al. | |
| 5,350,242 A * | 9/1994 | Wenzel | 384/97 |
| 5,377,771 A | 1/1995 | Wenzel | |
| 5,385,407 A | 1/1995 | De Lucia | |
| 6,416,225 B1 | 7/2002 | Cioceanu et al. | |
| 7,500,787 B2 | 3/2009 | Cioceanu | |
| 7,635,224 B2 * | 12/2009 | Wenzel | 384/97 |
| 8,157,025 B2 * | 4/2012 | Johnson | 175/74 |
| 2008/0197732 A1 * | 8/2008 | Cioceanu | 310/89 |

* cited by examiner

*Primary Examiner* — Phillip A Johnson
(74) *Attorney, Agent, or Firm* — Bennett Jones LLP

(57) ABSTRACT

A downhole drilling assembly which includes a drill bit assembly, and a mud motor, and a bearing assembly disposed between the drill bit assembly and the mud motor, wherein the bearing assembly includes an offset portion.

7 Claims, 2 Drawing Sheets

BENT BEARING ASSEMBLY FOR DOWNHOLE MUD MOTOR

CROSS REFERENCE TO RELATED APPLICATIONS

This application claims the priority benefit of Canadian Patent Application 2,751,181 filed on Aug. 31, 2011 entitled "Bent Bearing Assembly For Downhole Mud Motor", the contents of which are incorporated herein by reference.

FIELD OF THE INVENTION

The present invention relates to a bent bearing assembly for use with a downhole mud motor.

BACKGROUND OF THE INVENTION

In the drilling of oil and gas wells, it is common to drive the drill bit by a downhole mud motor located at the end of a drill string. In particular, drilling fluid, generally referred to as drill mud, is circulated to drive the motor by positive hydraulic displacement or turbine action. The mud then passes through the ports in the drill bit and carries material cut by the drill bit back to the surface through the annular space between the drill pipe and the resulting bore hole.

Bearing assemblies for wellbore drilling are mounted between the drill bit and the mud motor to permit rotation of the drill bit. The drill bit is attached to a hollow drive shaft, also known as a mandrel that is located within a bearing housing. The mandrel is rotated by the mud motor while the bearing housing is fixed to the drill string and remains relatively stationary. In its position behind the drill bit, the bearing assembly is subject to significant radial and axial loading. Radial and thrust bearings are thus located along the bearing assembly to absorb radial and axial loads.

It is often desired to have a borehole which deviates from the vertical or from an initial section of the well, in the case of slant drilling. Bent housings have been developed to permit such directional drilling. Conventional adjustable bent housings use an adjustable mandrel which provides a connection to the stator housing of the drilling motor, and a box connection to the bottom end of the bearing assembly. As is well known, the drive shaft passes through the bent housing.

Adjustable bent housings provide axial deviations by machining components of the housing to create a deviation, by machining deviating threads, or by machining one end of a tubular body which deviates from the other end. By combining two tubular components with axial deviations, an adjustable housing may vary between a straight configuration, and a cumulative bent configuration, which is the sum of the two deviations. These two components are threaded together and a locking nut or adjusting nut is provided to fix the two components together with the desired deviation. This locking nut must have a left-hand thread or a thread opposite the threaded connection of the two main tubular components.

Prior art adjustable bent housings often have two offset points, which commonly results in an oversize wellbore because a true straight housing cannot be achieved. In other cases, adjustable bent housings with a single offset point are known. However, in each case, the offset point is located above the bearing assembly, in the motor housing.

SUMMARY OF THE INVENTION

In one aspect, the invention comprises a bearing assembly for wellbore drilling which comprises:

(a) a mandrel comprising an upper mandrel and a lower mandrel, wherein the lower mandrel is adapted for connection to a drill bit assembly and the upper mandrel is adapted for connection to a mud motor drive shaft;
(b) a housing adapted for connection to a drill string, wherein the mandrel is telescopically disposed within the housing;
(c) two seal assemblies consisting of an upper seal assembly and a lower seal assembly, forming a single sealed bearing chamber disposed between the mandrel and the housing;
(d) a flow restrictor disposed between the mandrel and the housing, above the upper seal assembly;
(e) an upper radial bearing disposed between the upper mandrel and the housing and a lower radial bearing disposed between the lower mandrel and the housing, wherein both upper and lower radial bearings are disposed within the single sealed bearing chamber;
(f) an on-bottom thrust bearing stack bearing directly on the upper mandrel;
(g) an off-bottom thrust bearing, bearing directly on the upper mandrel; and
(h) wherein the housing comprises an offset portion.

In another aspect, the invention comprises a bearing assembly for downhole drill string comprising a mud motor and a stator connector, comprising:

(a) a mandrel adapted for connection to a drill bit assembly at one end and a mud motor drive shaft at the other end;
(b) a bearing housing, wherein the mandrel is telescopically disposed within the housing;
(c) a single sealed bearing chamber disposed between the mandrel and the housing;
(d) radial and thrust bearings disposed within the bearing chamber; and
(e) an offset housing attached to the bearing housing and adapted to be connected to a stator connector.

In another aspect, the invention comprises a downhole drilling assembly which includes a drill bit assembly, and a mud motor, and a bearing assembly disposed between the drill bit assembly and the mud motor, wherein the bearing assembly comprises an offset portion.

BRIEF DESCRIPTION OF THE DRAWINGS

The invention will now be described by way of an exemplary embodiment with reference to the accompanying simplified, diagrammatic, not-to-scale drawings.

DETAILED DESCRIPTION OF THE INVENTION

The present invention provides for an improved bearing assembly for a downhole mud motor. When describing the present invention, all terms not defined herein have their common art-recognized meanings.

Figure 2:
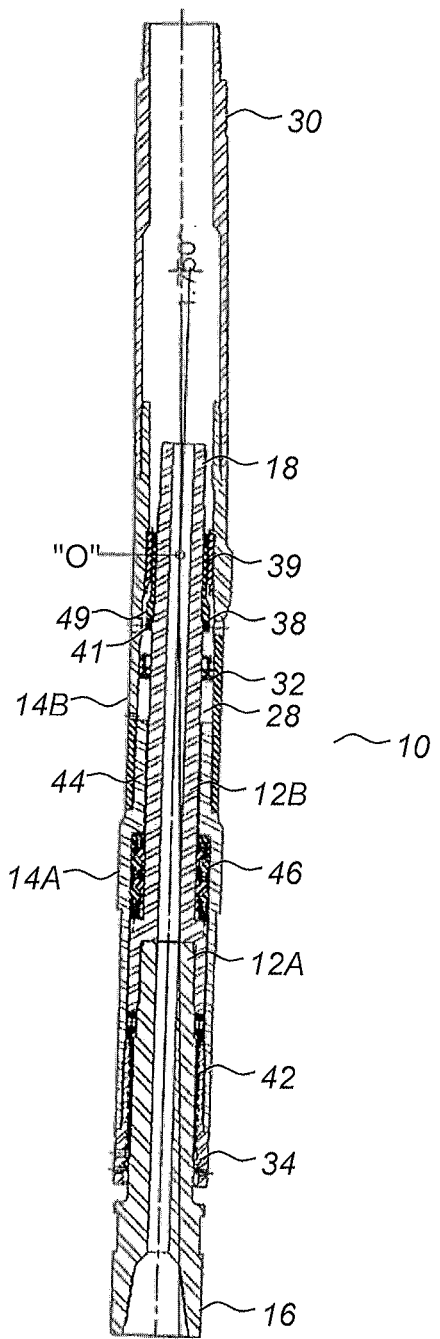
FIG. 2 shows a detailed cross-sectional view of the axial thrust bearing stack of the embodiment shown in FIG. 1.

As shown in FIG. 2, in one embodiment, a bearing assembly (10) includes a mandrel (12) comprising an upper mandrel (12A) and a lower mandrel (12B). It is possible to use a one-piece mandrel, as opposed to the two-piece mandrel illustrated. A housing (14) is telescopically disposed about mandrel (12), which is rotatable within the housing. The box end (16) of the lower mandrel (12B) is adapted for connection directly or indirectly to a drill bit (not shown). The upper end (18) of the upper mandrel (12A) is adapted for connection to the power section of mud motor (not shown), as is well known in the art. The housing (14) is adapted for connection to the lower end of stator connector (30).

As used herein, an "offset portion" is a portion of a tubular element which comprises an axial deviation, such that the central axis of the tubular element is deviated. The degree of offset or deviation is expressed as the angle between the central axes of the tubular element on either side of the deviation.

Figure 1:
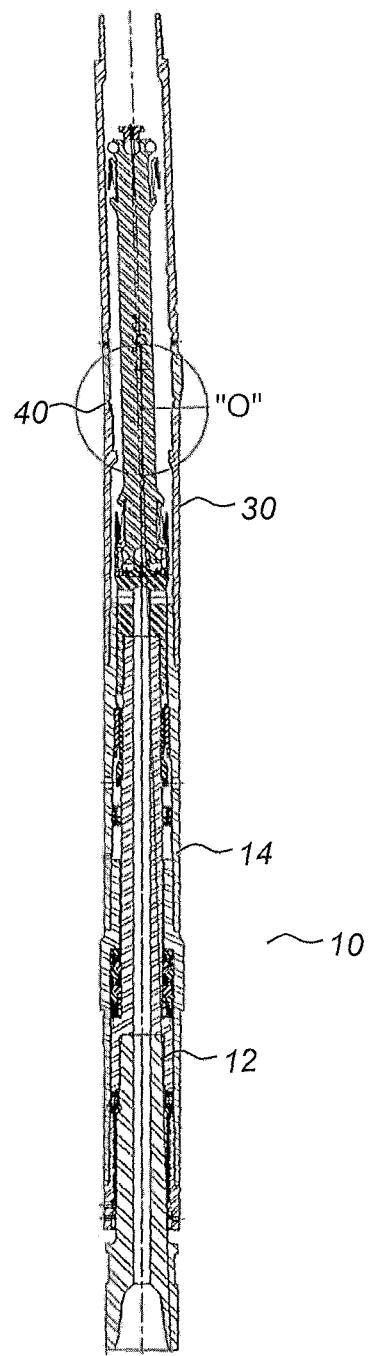
FIG. 1 shows a cross-sectional view along the axis of one embodiment of a bearing assembly.

The prior art bearing assembly housing shown in FIG. 1, which is not offset, leads to a stator connector (30) and a bent housing (40), which is in some cases adjustable. An adjustable bent housing of this general configuration is disclosed in co-pending Canadian application no. 2,578,879, the contents of which are incorporated herein by reference, where permitted. The offset point "O" is disposed far above the bearing assembly housing (14).

In contrast, in embodiments of the present invention, the bearing assembly housing (14) comprises an offset portion. In one embodiment, the actual offset point is shown in FIG. 2 as point "O". As may be seen, the offset point is significantly closer to the drill bit (not shown) than in the prior art, where the offset point is above the stator connector (30). In other words, the "bit-to-bend" distance is reduced. The bearing assembly is disposed between the drill bit assembly (not shown) and the mud motor (not shown).

The bearing assembly housing (14) may comprise a lower housing (14A) and an upper housing (14B). The offset is created by a deviation in the upper housing (14B) which attaches to the lower housing (14A) by a standard threaded connection.

In one embodiment, the amount of offset is 1.75°, although this is not a limiting feature of the invention, unless specifically claimed to be. Because the offset point is closer to the drill bit than in a conventional bent drilling assembly, the hole size created by the drilling assembly is smaller, and is closer to the actual diameter of the drill bit.

In operation, drilling fluid or mud is pumped through the drillstring into bore of the mandrel. This fluid then passes out through the ports in the drill bit and back up the outside of the housing (14) on its way back to surface. Some of the fluid also passes through the annular space between the mandrel (12) and the housing (14).

The drilling fluid is under pressure as it passes through this route. In particular, in the bores of the housing and the mandrel, fluid is pressurized by hydrostatic pressure as well as pump pressure. Once the fluid passes through the drill bit ports, any pump pressure is dissipated leaving only hydrostatic pressure acting on the drilling fluid. Thus, generally, the fluid inside the bearing assembly is at a greater pressure than the fluid outside the bearing assembly.

A lubricant-filled bearing chamber is disposed between mandrel (12) and housing (14) to support rotation of the mandrel relative to the housing. The lubricant is preferably oil but can be other substitutes such as silicone, grease, or the like. The bearing chamber is filled with lubricant through fill ports that are sealed off before use by metal threaded plugs or welded caps. The bearing chamber is sealed by an upper sealing assembly (32) and a lower sealing assembly (34). These seals (32, 34) maintain the lubricant within the chamber about the bearing members contained therein. The upper and lower sealing assemblies may comprise O-rings or other resilient sealing members such as PolyPak® or Kalsi® seals. The upper sealing assembly (32) preferably includes a member movable axially through the annular space between the housing and the mandrel, to permit expansion and contraction in the chamber volume, as may be caused by changes in external pressure and temperature. As is well known in the art, the inner surface of the housing may be coated to provide a smooth durable surface over which the sealing assembly can move.

In one embodiment, the sealing assemblies (32, 34) at either end of bearing chamber (28) are pressure balanced to improve bearing operation and useful life. In particular, the lower sealing assembly (34) is exposed to external pressure and openings are formed through the housing (14) to permit communication of fluids at external pressure to the upper seal assembly (32). The bearing chamber (28) is positioned between a flow restrictor (38) and the box end (16) of the mandrel.

The flow restrictor (38) may include a stationary flow restrictor (39) secured within the housing and a rotatable flow restrictor (40) on the mandrel. A stopper ring (41) supports and retains the rotatable flow restrictor on the mandrel. A suitable flow restrictor is one adapted to lose no more than 10% pumping pressure, although other flow restrictors could be used, as desired. The flow restrictor (38) restricts fluid flow in the annular space between the mandrel and the housing. This reduction in flow effectively reduces the differential pressure of the fluid that comes into contact with the upper seal assembly (32). In particular, fluid jetting against the seal assembly (32) is substantially eliminated. Thus, flow restrictor (38) tends to substantially equalize the pressures acting against the upper and lower seal assemblies (32, 34).

The bearing assembly comprises radial and thrust bearings as is known to those skilled in the art. In one embodiment, the bearing chamber (28) contains two radial bearing surfaces (42, 44) and axial thrust bearing stack (46). The radial bearings (42, 44) are positioned on either side of the axial thrust bearings to provide lateral support for them. Additionally, the upper radial bearing surface (44) is part of the upper mandrel (12A), while the lower radial bearing surface (42) is part of the lower mandrel (12B). As will be appreciated, all of these bearings need not be contained in the same oil-filled chamber, although in a preferred embodiment, there is a single oil-filled chamber.

In one embodiment, the bearing assembly includes only the two radial bearings located in the bearing chamber (28). The lower radial bearing preferably runs the substantial length of the lower mandrel (12B) in order to increase radial load capacity between the mandrel (12) and the housing (14).

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

What is claimed is:

1. A downhole drilling assembly which includes a drill bit assembly, a mud motor, and a bearing assembly disposed between the drill bit assembly and the mud motor, wherein the bearing assembly comprises:
   (a) an undeviated mandrel connected to the drill bit assembly at one end and a drive shaft of the mud motor at the other end,
   (b) a bearing housing, wherein the mandrel is telescopically disposed within the housing, wherein the housing comprises an undeviated lower portion and an attached deviated upper portion defining an offset point and connected to a stator connector of the mud motor;
   (c) a single sealed bearing chamber disposed between the mandrel and the housing; and (d) radial and thrust bearings disposed within the bearing chamber;

wherein the offset point is disposed above the bearing chamber.

2. A bearing assembly for a downhole drill string comprising a mud motor and a stator connector, the bearing assembly comprising:
   (a) a undeviated mandrel adapted for connection to a drill bit assembly at one end and a mud motor drive shaft at the other end;
   (b) a bearing housing, wherein the mandrel is telescopically disposed within the housing, wherein the bearing housing comprises an undeviated lower portion and an attached deviated upper portion defining an offset point and adapted to be connected to the stator connector;
   (c) a single sealed bearing chamber disposed between the mandrel and the housing; and
   (d) radial and thrust bearings disposed within the bearing chamber;

wherein the offset point is disposed above the bearing chamber.

3. The assembly of claim 2 or claim 1 wherein the mandrel is a two piece mandrel, and the radial bearing comprises an upper radial bearing and a lower radial bearing, each radial bearing comprising the outer surface of the mandrel and the inner surface of the bearing housing.

4. The assembly of claim 2 comprising a lower seal assembly at a lower end of the sealed bearing chamber, and an upper seal assembly at an upper end of the bearing chamber, wherein both the lower and upper seal assemblies are exposed to external pressure.

5. The assembly of claim 4 further comprising a flow restrictor disposed between the mandrel and the upper portion of the bearing housing.

6. The assembly of claim 5 wherein the flow restrictor is approximately level with the offset point.

7. The assembly of claim 2 or claim 1 wherein the degree of offset is about 1.75°.

* * * * *